Patented Jan. 21, 1936

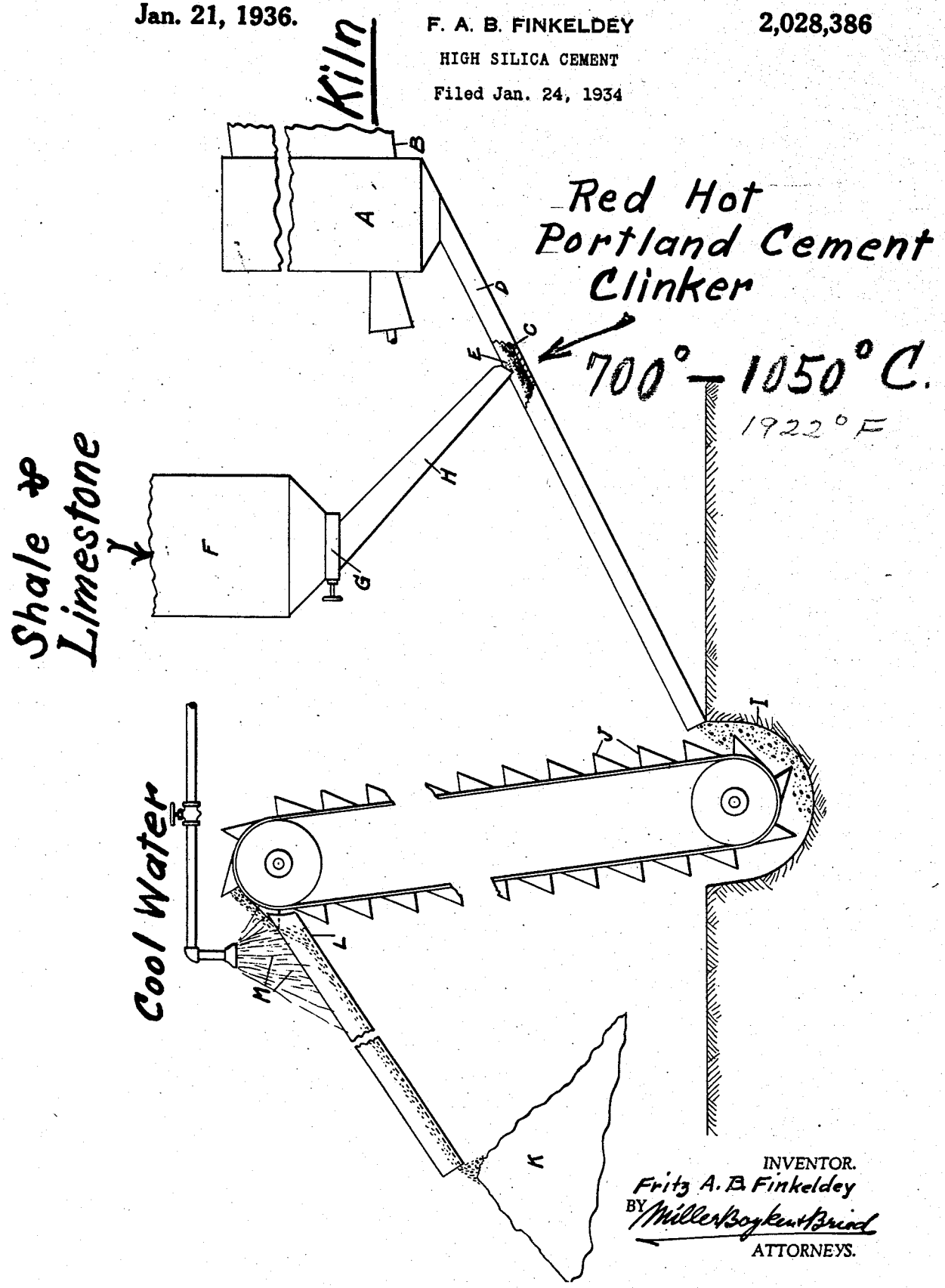

2,028,386

UNITED STATES PATENT OFFICE 2,028,386

HIGH SILICA CEMENT

Fritz A. B. Finkeldey, New York, N. Y.

Application January 24, 1934, Serial No. 708,071

8 Claims. (Cl. 106—25)

This invention relates to the type of Portland cement which includes an activated siliceous additive ground therewith in order to satisfy the free lime developed during the final hydration of the cement during the setting of concrete made therewith, such for instance as disclosed in the Rice Patent No. 1,907,003 of May 2, 1933, and the object of the present invention is to provide an improved process of manufacturing such cements whereby the cost of production is reduced, and the cement is more uniform in its quality, the concrete product is stronger, and danger of unsoundness is eliminated. Other advantages of the process will appear in the following description and accompanying drawing.

In the drawing the figure is a somewhat diagrammatic elevation of apparatus for carrying out my improved process.

Before describing the invention in detail, it may be stated that the cement literature and many prior patents show it to be old to add siliceous materials such as puzzuolana, trass, volcanic ash, pumice, slag, diatomaceous earth, siliceous clays, shale, etc. to Portland cements as by mixing or grinding therewith or with the Portland cement clinker, to offer an acidic material to the free lime evolved in setting of concrete made of the cement to combine with it to form insoluble silicates of lime, etc. and thus render the concrete proof against the action of sea water and other lime-attacking agents. It was known that some forms of silica used had to be first activated by preliminary heating if the best results were to be expected. It was also known that a small quantity of lime added with the siliceous material was advantageous as an aid in starting the desired reaction.

The various patents issued on such cements were granted to the particular steps followed in preparing or incorporating the additive materials, such for instance as the limited water addition in the Wilner Patent No. 1,785,508 where shale and lime were calcined separately at relatively low temperatures, then mixed and finely ground, and agitated with a limited amount of water or steam introduced to hydrate the quicklime and perhaps initiate a slight reaction between the lime and shale, and the resulting dry powder formed a cement itself or could be further ground with Portland cement clinker to make a modified cement. In other processes hydrated lime was used.

My improved process secures the desired advantages of such additions to Portland cement to form a high-silica sea water resisting cement, but is carried out in a different manner and at much greater economy of manufacture effected by utilizing the otherwise waste heat of the Portland cement clinker as it emerges from the kiln to both activate the shale or other siliceous addition, as well as burn limestone to produce a small amount of CaO throughout the mass, while simultaneously cooling the clinker in contact with the crushed solid additive materials mixed directly therewith, then spraying the mixed mass of clinker and additives while still hot with cool water as it passes to the storage piles or further cooling step, to thereby hydrate the CaO while at the same time quenching the additive material and clinker and dropping its temperature from almost red heat to a point of stabilization, preferably down to about 300° C.

This process I have found to produce a more highly activated siliceous additive, also one which is softer or more friable and will grind much easier, also insure freedom from any unslaked lime to cause unsoundness in the cement, and at the same time yield a lighter color to the clinker and result in a cement of increased strength.

In carrying out the process I may use any suitable apparatus, as for instance that of the accompanying drawing wherein A is the discharge end of a rotary cement kiln B, the red hot Portland cement clinker C of which runs down a chute D while shale and limestone E (crushed to about ⅛th of an inch and smaller, so as to pass through a screen of from 4 to 10 wires per inch) in the desired proportions, is fed from a suitable bin F or other source of supply through a suitable controlling gate G or poidometer and chute H directly upon the red hot clinker C to roll down the chute D with it so as to be thoroughly mixed therewith and drop into the elevator boot I from where it is picked up by a bucket elevator J and carried upward for delivery to the storage piles K or air cooling racks.

The time of contact with the red hot clinker includes that in chute D, boot I and elevator J, a total of perhaps ten to thirty minutes during which the additive material is subject to a heat ranging from about 700° to 1050° C. and down until the top of the slowly moving elevator is reached and the still very hot material is discharged from the elevator to a chute L to run to the storage pile, or cross conveyor (not shown) leading to the pile or piles or cooling racks or means. As the hot mixed materials are discharged from the elevator I provide a spray of cool water M which serves two purposes: first, to hydrate the CaO developed by the limestone content from the heat of the clinker, and, second, to quickly cool both the additive material such as shale, as well as the clinker.

This water cooling carried out in the general manner indicated is one of the main features of the invention as it brings in the well-known advantages of water cooling of hot clinker with similar though hitherto unknown advantages in regard to the shale, and which as previously stated is rendered more highly activated in its affinity for lime, as well as more friable and much more easily grindable into cement.

The proportions of clay or siliceous material as well as lime or limestone to be added will depend of course on the analysis of these materials as well as of the clinker to which they are added, but with a normal Portland cement clinker and Monterey shale the preferred proportions would be such as to yield about 24% of calcined shale, and limestone to yield about 6% CaO in the finished combined materials.

The piled hot materials are of course thoroughly intermingled and so remain for some time before grinding, thus insuring a complete penetration of the moisture into all the lime particles and a partial reaction to set up between the lime and activated silica particles. When sufficiently cooled the mixed materials are ground to cement fineness in the ordinary way, the usual proportion of gypsum generally being added to control the set.

The claims of the present case are limited to the treatment described when practiced with mixtures of siliceous and calcareous materials, while claims to the similar treatment of siliceous material only are contained in my copending divisional application filed under Serial No. 27,651 on June 21, 1935.

I claim:

1. Improvements in the manufacture of cement which comprise mixing additional siliceous and calcareous material with hot cement clinker as it comes from the clinkering kiln at a temperature ranging from about 700 to about 1050° C., maintaining the added materials in contact with the hot clinker until the lime is calcined, then spraying the mixed materials with water to hydrate the CaO, the proportion of the added siliceous material being such as to equal up to about 24% of the combined materials when finished, and the calcareous material to yield an additional CaO content up to about 6% of the combined finished materials.

2. Improvements in the manufacture of cement which comprise mixing additional siliceous and calcareous material with hot cement clinker as it comes from the clinkering kiln at a temperature ranging from about 700 to about 1050° C., maintaining the added materials in contact with the hot clinker until the lime is calcined and the siliceous material is activated, then spraying the mixed materials with water to hydrate the CaO, the proportion of the added siliceous material being such as to equal up to about 24% of the combined materials when finished, and the calcareous material to yield an additional CaO content up to about 6% of the combined finished materials.

3. Improvements in the manufacture of cement which comprise mixing additional siliceous material with hot cement clinker as it comes from the kiln at a temperature ranging from about 700 to about 1050° C., and maintaining the materials in contact until the siliceous material is activated, then cooling the mixed materials with water, the proportion of siliceous material added to the clinker being such as to equal up to about 30% of the combined materials when finished.

4. Improvements in the manufacture of cement which comprise mixing additional siliceous material with hot cement clinker as it comes from the kiln at a temperature ranging from about 700 to about 1050° C., and maintaining the materials in contact until the siliceous material is activated, then cooling the mixed materials with water and passing to storage in moist condition, the proportion of siliceous material added to the clinker being such as to equal up to about 30% of the combined materials when finished.

5. In the process of claim 1, said calcareous material reduced to at least a coarse granular condition before adding to the hot clinker.

6. In the process of claim 1, said siliceous and calcareous material reduced to at least a coarse granular condition before adding to the hot clinker.

7. Improvements in the manufacture of cement which comprise mixing additional siliceous and calcareous materials with hot cement clinker as it comes from the clinkering kiln at a temperature ranging from about 700 to about 1050° C. and maintained in contact therewith for a time period to effect calcination of the calcareous material, the proportion of the added siliceous material being such as to equal up to about 24% of the combined materials when finished, and the calcareous material to yield an additional CaO content up to about 6% of the combined finished materials.

8. Improvements in the manufacture of cement which comprise mixing crushed shale and limestone with hot Portland cement clinker as it comes from the clinkering kiln at a temperature ranging from about 700 to about 1050° C. and maintained in contact therewith for a time period to effect calcination of the limestone and activation of the shale, the shale being in amount to equal when calcined about 24% of the finished combined materials and the limestone sufficient to yield about a 6% additional CaO content thereto.

FRITZ A. B. FINKELDEY.